July 30, 1935.  G. H. PFEFFERLE  2,009,744
REPAIR DEVICE FOR PIPE LINES
Filed June 25, 1931  3 Sheets-Sheet 1

INVENTOR
George H. Pfefferle
BY
Louis Prevost Whitaker
ATTORNEY

July 30, 1935. G. H. PFEFFERLE 2,009,744
REPAIR DEVICE FOR PIPE LINES
Filed June 25, 1931 3 Sheets-Sheet 2
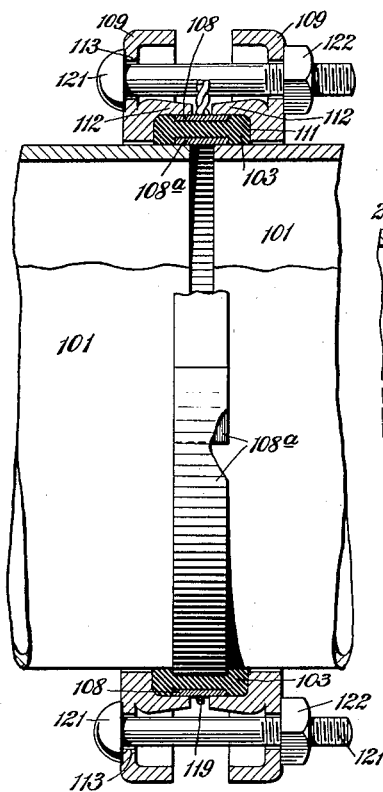
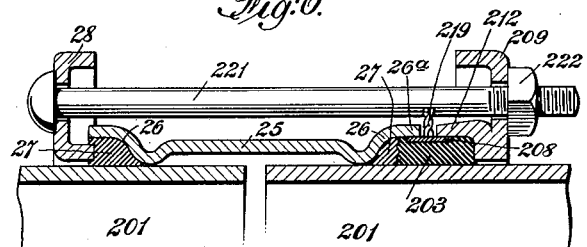
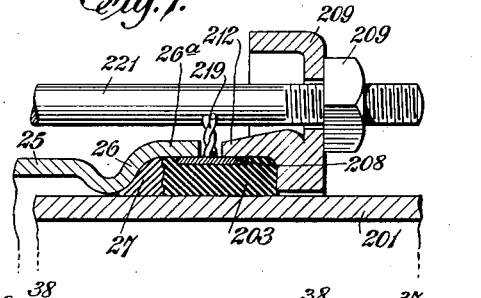
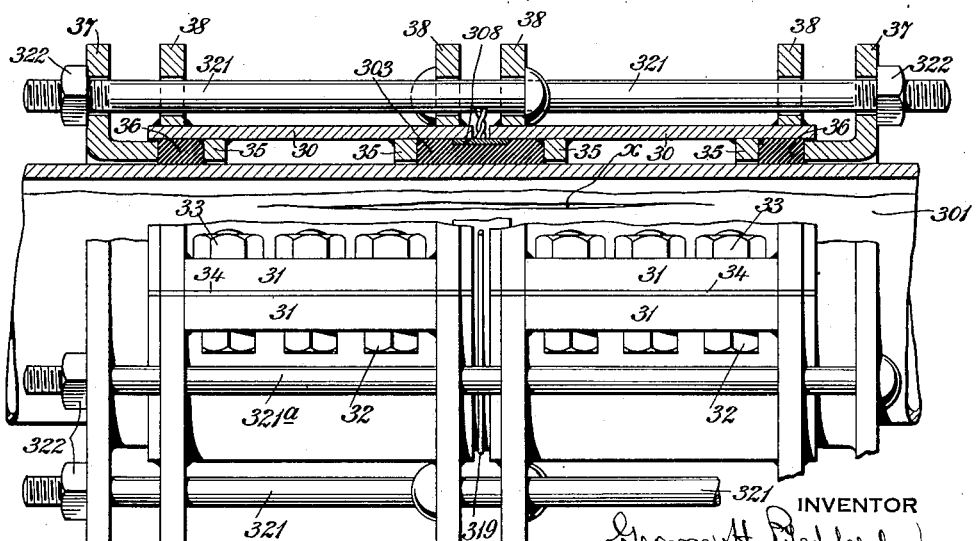
INVENTOR
George H. Pfefferle
BY
Louis Prevost Whitaker
ATTORNEY

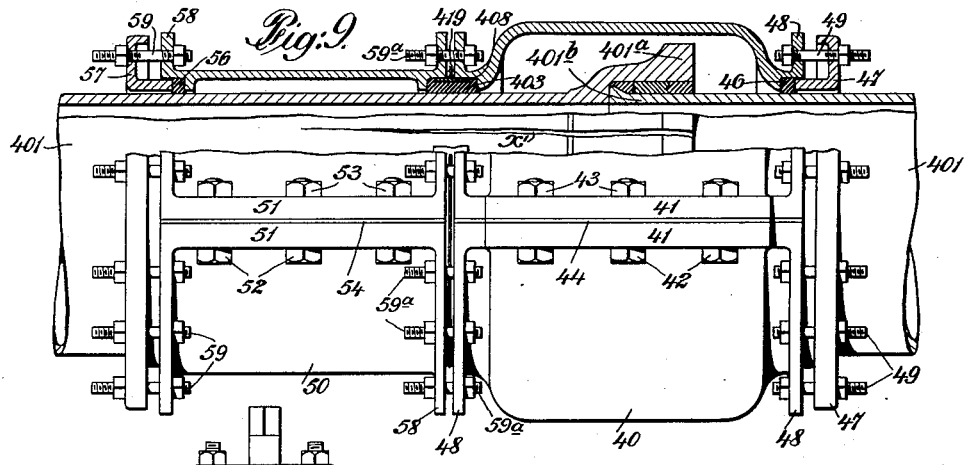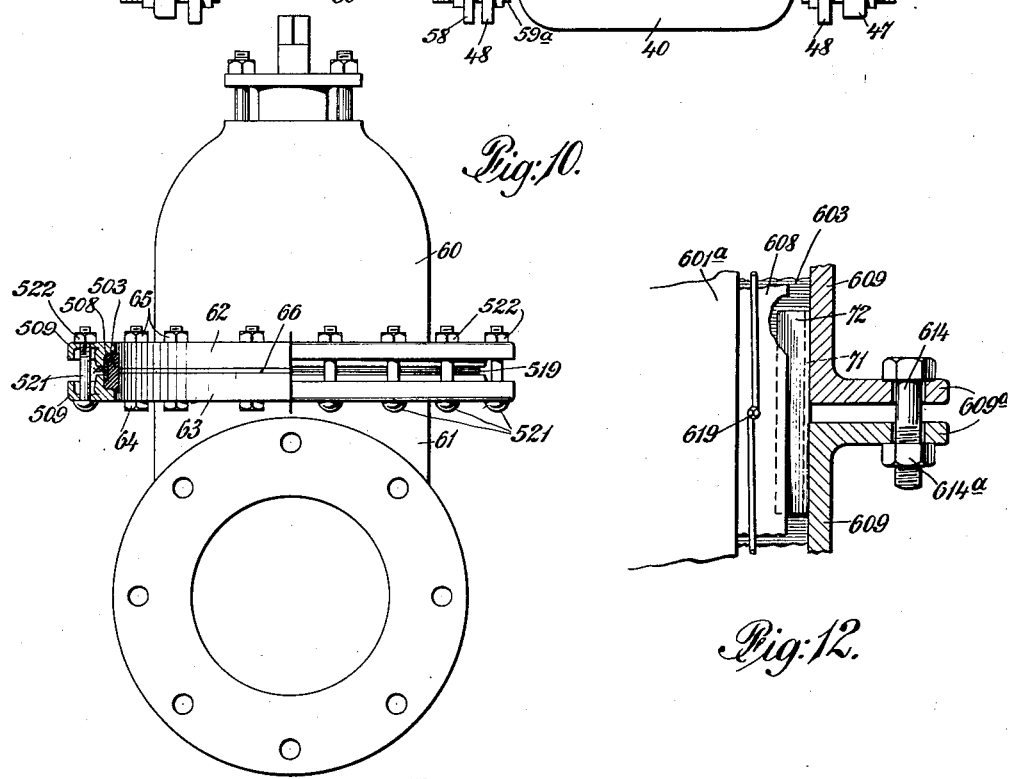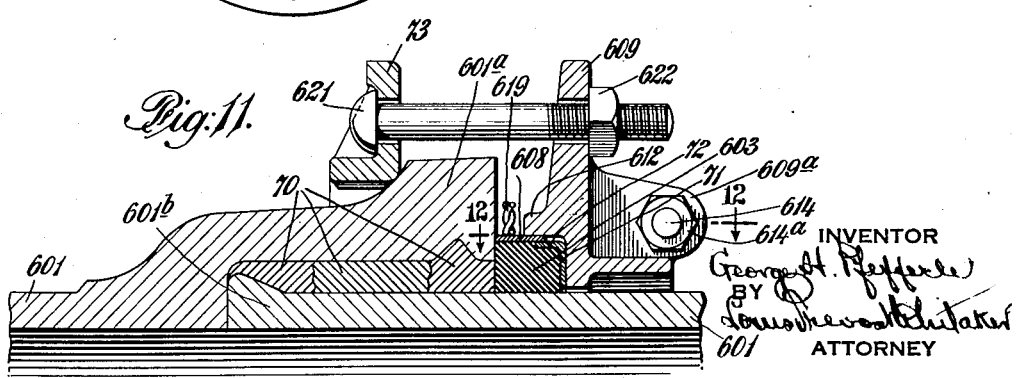

Patented July 30, 1935

2,009,744

UNITED STATES PATENT OFFICE 2,009,744

REPAIR DEVICE FOR PIPE LINES

George H. Pfefferle, Bradford, Pa., assignor to S. R. Dresser Manufacturing Company, Bradford, Pa., a corporation of Pennsylvania Application June 25, 1931, Serial No. 546,789

10 Claims. (Cl. 285—119)

My invention consists in the novel features hereinafter described, reference being had to the accompanying drawings, which illustrate several embodiments of the same, selected by me for purposes of illustration, and the said invention is fully disclosed in the following description and claims.

The object of my invention is to provide a simple, cheap and efficient means for repairing leaks in pipe lines without interruption of the delivery of fluid therethrough, and without removing any part of or connected with the line. Such leaks may be caused by defective welds at the meeting ends of the pipe sections, where the line is composed of sections welded together or by defective packing at one end of a pipe coupling connecting adjacent pipe sections of the plain end or bell and spigot type, or by cracks in the pipe sections, either of the plain end or bell and spigot type, of greater length than can be repaired by the ordinary split sleeve repair devices now in use. My repair device can also be used to repair leaking flange connections of gate and other valves, and for many other purposes, and in some instances the device may be employed as a coupling for uniting the adjacent ends of plain end pipes.

In all these cases the removal and replacement of the leaking part or parts would necessitate the shutting down of the line and interruption of service at great expense to the owner of the line and inconvenience to the public served thereby. It will also be obvious that circular integral repair devices of any kind cannot be used as they cannot be placed around the pipe or other leaking part.

Briefly stated, my repair device comprises a straight strip or gasket member of compressible elastic material preferably rubber or rubber compound long enough to surround the part to be repaired and preferably having its meeting ends beveled, a straight thin metal strip or confining member of less width than the gasket member, and preferably of greater length than the gasket member, so that its ends may be overlapped, and clamping elements, one or both of which is recessed to receive the edges of the rubber strip and also the metal confining strip, one or both of the clamping elements engaging and overlapping the outer connecting bolts to force the clamping elements toward each other to compress the rubber strip or gasket member between the part which it surrounds and the metal confining strip, the latter being reinforced by the overlapping portions of the clamping elements. The clamping elements may be split clamping rings (or integral clamping rings where the device is used as a coupling), or one or both of the clamping elements may be formed by parts of the other devices, as the end packing recess of the middle ring of a pipe coupling, or the similar portion of a split sleeve, or the end of a bell. I prefer to provide, also, a means for temporarily securing the rubber strip or gasket member and the confining strip after they are placed in position, and for this purpose I prefer to wrap a piece of wire around the metal confining strip and unite the ends of the wire by twisting.

My present application is a continuation in part of my former application for Letters Patent of the United States filed June 19th, 1930 and given Serial Number 466,388.

In the accompanying drawings, in which I have illustrated several embodiments of my invention, selected by me for purposes of illustration, Fig. 1 is a sectional view of the welded meeting ends of two pipe sections with my improved repair device applied thereto.

Fig. 5 is a view similar to Fig. 1, showing my repair device used as a coupling for plain end pipe sections.

Fig. 6 is a partial sectional view of a packed pipe coupling for plain end pipe sections showing my repair device applied to one end of the coupling.

Fig. 7 is an enlarged detail section of a portion of the parts illustrated in Fig. 6.

Fig. 8 is a view, partly in section, of a pipe section showing the manner of repairing a longitudinal crack therein by the use of a plurality of split sleeves connected by my repair device.

Fig. 9 is a similar view showing my repair device in connection with a plurality of split sleeves, for repairing a longitudinally cracked bell end of a bell and spigot pipe section.

Fig. 10 shows, in elevation, partly in section, my repair device used for the repair of a leaking flange joint in a gate valve.

Fig. 11 is a detail sectional view of a portion of a bell and spigot pipe joint showing a modified form of my repair device applied thereto.

Fig. 12 represents a section on line 12—12 of Fig. 11.

Figure 1:
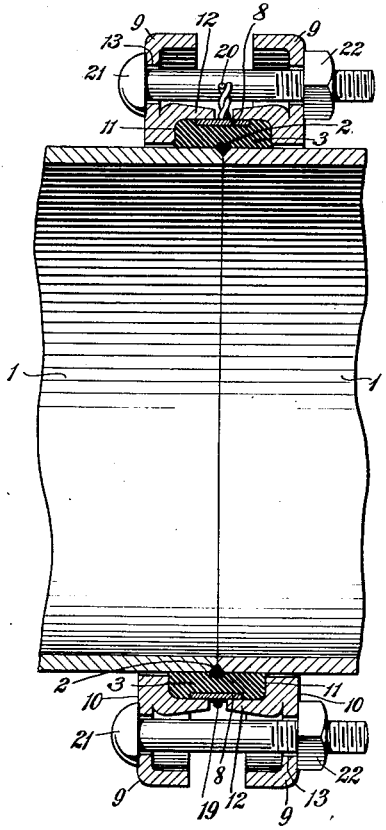

In the laying of pipe lines, especially for the transportation of natural gas, it is customary in many instances to unite the adjacent ends of the pipe sections by welding. Occasionally these welded joints, while serving to unite the adjacent pipe ends, are found to be defective, when the line is subjected to internal pressures, in that they permit of leakage at the point of weld. Such welds are referred to as porous welds in that they do not hermetically seal the joint between the pipes which they physically connect.

In Figs. 1 to 4 of the drawings, I, I, represent the meeting ends of two pipe sections (or other cylindrical parts) of wrought or cast metal, which are shown as united by a weld, indicated at 2, formed in any usual or desired manner, and which it may be assumed is in a leaking condition at the weld when exposed to internal pressure. 3 represents a gasket member formed of a straight strip of rubber or other suitable elastic packing material, which is of sufficient width to extend over the weld and for a certain distance upon the outer surface of the pipe sections on opposite sides of the weld, and is of a sufficient length to exactly surround the joint and bring the end faces, indicated at 4, together. The end faces, 4, may extend transversely perpendicularly to the lateral edges of the strip, or the ends may be beveled, as indicated in the drawings. The gasket member may be formed from straight rubber stock, or it may be formed as a ring and severed to permit it to be applied to the joint, as preferred. The inner face of the gasket member, when used to repair a welded joint, may be provided with a centrally located groove, as indicated at 5, to accommodate the projecting portions of the weld, which usually extend slightly beyond the outer faces of the pipe sections. 8 represents a metallic confining strip or band, of hard metal which will not yield to the pressure of the elastic gasket when the latter is under compression preferably of steel, constructed to surround the gasket member. This band is preferably of such length that its ends will overlap as shown in the drawings. I use the term hard metal to distinguish from a soft metal such as lead which is sometimes used to encase or cover the packing portions of an elastic gasket, and which will be readily distorted by the contiguous portions of elastic gasket when under compression, to conform to irregularities in the surface of a coupling element engaging its opposite face.

Figure 4:
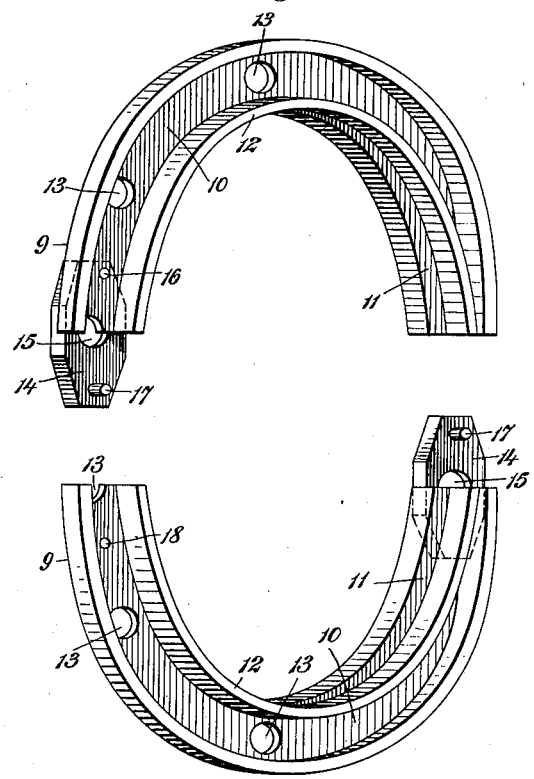
Fig. 4 is a detail perspective view of one of the clamping rings illustrated in Fig. 1, showing the segmental portions thereof in separated relation.
Figure 2:
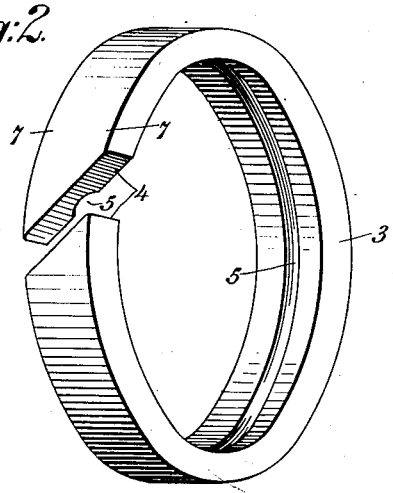
Fig. 2 is a detail perspective of the gasket member of my repair device.

In connection with the gasket member and confining strip or band, I employ a pair of clamping rings, indicated as a whole at 9, 9, formed in segments and connected together, for engaging the edges of the gasket member, and adapted to be engaged by clamping bolts and nuts. Each of these rings comprises an annular plate member, 10, disposed perpendicularly to the axis of the joint, and provided with an annular face, indicated at 11 substantially perpendicular to the axis of the ring, to engage the lateral edges of the gasket member, 3, which are likewise substantially perpendicular to its inner and outer faces. Each of these clamping rings is also preferably provided with a substantially cylindrical flange member, 12, projecting from the inner face thereof and extending over the adjacent marginal portion, 7, of the gasket member, and over marginal portions of the confining strip or band, 8, as clearly shown in Fig. 1. The length of the flange members, 12, is such that they cannot be brought into contact by the tightening of the bolt, but will leave an annular opening between them when in final position. The clamping rings are preferably formed in two segments, as indicated in Fig. 4, and the plate members, 10, are provided with bolt holes, 13, forming a circular series. Two of the bolt holes are arranged with their axes in the plane of separation between the segments, and at these points the segments are united by bridge plates, indicated at 14, which are secured to each of the segments on opposite sides of the bolt holes when in operative position, so as to connect the segments, and each bridge plate is provided with a bolt aperture, 15, corresponding with the divided bolt aperture with which it registers. The segments of the rings, 9, may be formed separately, or the rings may be formed integrally and severed, as preferred. For convenience in assembling, it is customary to rivet one of the bridge plates at one end, to one end of a ring segment, as indicated at 16, and to provide the other end of the bridge plate with a pin, 17, to engage a locking aperture, 18, in the other end of the opposite segment. The particular construction of this clamping ring, however, forms no part of my present invention, and is not claimed herein.

It will be understood that the parts previously described will be formed in the required sizes for all sizes of pipe with which they are to be employed. When it is desired to apply the repair device for repairing a porous or leaking welded joint, the gasket member and confining strip or band, 8, are wrapped around the weld, the projecting portions of which will enter the recess, 5, on the inner face of the gasket. The retaining band is then secured in position around the gasket member in any desired manner. For example, I find it convenient to pass a wire, indicated at 19, around the exterior face of the band, the ends of the wire being twisted together, as indicated at 20. This holds the gasket and band in place until the clamping rings are applied, and I find it convenient to employ a wire for this purpose, and it can be accommodated between the adjacent edges of the flanges, 12, of the rings without interfering with the tightening of the rings. The clamping rings are then placed around the pipe sections, their segments united and the rings pressed toward each other, so that the flange members, 12, of the rings will enclose and fit over the marginal portions, 7, of the gasket member, and over the marginal portions of the steel strip or band, 8, as shown in Fig. 1.

The clamping rings are then connected by bolts, 21, passing through the registering bolt holes of the ring, and nuts, 22, are placed on the bolts and screwed up. As the nuts are tightened, the clamping rings are forced toward each other, so as to compress the gasket member between the faces, 11, 11, of the rings, in a direction longitudinally of the pipe sections the flange portions of the clamping rings telescoping over the confining strip or band. This will cause the gasket to be expanded radially in a direction perpendicular to the axis of the pipes and between the outer surfaces of the pipes at each side of the weld on the one hand, and the confining strip or band, 8, and the cylindrical flange members reinforcing the confining band, so as to make a perfectly tight joint. The rubber gasket is preferably of slightly less thickness than the distance from the outer surface of the pipe to the inner faces of flanges, 12, and as the gasket is compressed the rubber flows around the edges of the confining strip or band, 8, so as to bring the outer surface of the gasket member substantially flush with the outer surface of said confining strip or band, as shown in Fig. 1. The confining strip is thus embedded in the gasket member and is definitely positioned with respect thereto, that is, in the center of the gasket member, so that it is held by its engagement with the gasket member against lateral movement, and must remain in position to bridge the space between the flanges of the clamping members. The confining strip or band, 8, in addition to preventing the escape of the packing by cold flowing in radial directions between the adjacent edges of the flanges, 12, 12, also serves a very definite and important function in reducing the friction between the clamping rings and the gasket as the clamping rings are drawn together and telescope over the confining strip or band, thus preventing the inner surface of the gasket from being pulled away from the pipe sections as the bolts are tightened.

Figure 3:
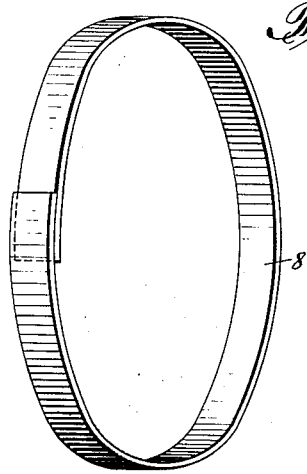
Fig. 3 is a detail perspective view of a confining strip or band used in connection therewith.

In some instances I have found it entirely practical to employ my invention as a coupling for plain end pipes, in cases where the pipe sections are not subject to material endwise movement, which would withdraw one or both from the device. Such an arrangement is shown in Fig. 5, in which the parts corresponding with those illustrated in Figs. 1 to 4 are given the same reference numerals with the addition of 100. In Fig. 5 the adjacent ends of the plain end pipe sections, 101, are shown slightly separated instead of welded together, and a second confining strip or band of steel or other hard metal, indicated at 108a, also constructed as indicated in Fig. 3, as a flat metal strip, is wrapped around the adjacent ends of the pipe sections, in engagement with the inner face of the gasket member, 103, which in this case is not recessed. This inner confining strip or band bridges the space between the pipe ends and prevents the gasket member when compressed from flowing radially into the gap between the ends of the pipe. Where the device is used as a coupling so that the clamping members can be slipped over the ends of the pipe sections, the clamping members, 109, may be integral rings, although split rings may be used if desired, or in cases where it is impossible to slip the rings over the pipe ends in assembling the device.

The device shown in Fig. 5 otherwise is constructed and assembled in the same manner as previously described and will provide a tight coupling for the adjacent pipe ends. It will be understood that as the bolts, 121, and nuts, 122, are tightened the material of the gasket member, 103, will flow inwardly into contact with the outer surfaces of the pipe ends at the opposite edges of the inner confining strip or band, 108a, and will likewise flow outwardly into contact with the inner faces of flanges, 112, of the clamping elements, at the opposite edges of the confining strip or band, 108, thus embedding both of the confining strips or bands in the gasket member, as clearly shown in this figure.

In Figs. 6 and 7, in which the parts corresponding to those illustrated in Figs. 1 to 4 are given the same reference numerals with the addition of 200, I have illustrated the application of my device to repair a leak at one end of a pipe coupling for plain end pipes. In this case one of the clamping elements is provided by the end packing recess of the middle ring or sleeve of the coupling, and the other is provided by the end clamping ring, such as is shown for example in Fig. 4.

In these figures, two plain end pipes, 201, 201, are shown connected by a pipe coupling of well known construction comprising a middle ring, 25, having annular end packing recesses, indicated at 26, 26, containing annular packing rings, 27, 27. 28 represents one of the original clamping rings of the coupling, and is shown in position to compress one of the packing rings, 27, in the usual manner. If it be assumed that a leaky condition has been discovered at one end of such a coupling in a pipe line, the bolts are removed and the clamping ring adjacent to the leaking end of the coupling is dispensed with, either by sliding it along the pipe, or cutting it and removing it therefrom. A portion of the adjacent packing, 27, is removed, as indicated at the right in Figs. 6 and 7, leaving a projecting portion of the adjacent packing recess, indicated at 26a, beneath which one edge of the gasket member, 203, and the confining strip or band, 208, may be placed around the adjacent pipe section and secured temporarily by the wire, 219, in the manner described. A clamping ring, indicated at 209, is then placed in position to engage the outer edge of the gasket member, 203, so that its flange, 212, will extend over the metal confining strip or band, 208 of steel or other hard metal. The bolts, 221, of greater length than the regular through bolts of the coupling are then passed through registering apertures in the clamping ring, 28, and the clamping ring, 209, and provided with nuts, 222, which are then drawn up, thus compressing the gasket member longitudinally of the pipe, and also transversely so as to effect a perfectly tight joint. This use of my improved device will be found very advantageous where a leak is found at one end only of a pipe joint of this general type.

For the purpose of repairing a hole in a pipe section and for completely enclosing a leaking pipe joint, various kinds of split sleeves have been devised and are in general use. It sometimes happens, however, that a split or crack will occur in a pipe section of such length than one of the split sleeve constructions of standard size will be sufficiently long to enclose the entire crack, and if a plurality of sleeves with their clamping rings were to be applied, there would be spaces between the sleeves which would not be closed. I have found that my present invention can be used advantageously between the adjacent ends of clamping sleeves for the purpose of connecting two, or any desired number, and thereby providing a sleeve length sufficient to cover the longest crack, by using stock sleeves. Thus, in Fig. 8, for example, in which the parts corresponding with those shown in Figs. 1 to 4 are given the same numerals with the addition of 300 I have shown an illustration of this use of my invention.

In this figure, 301, represents a pipe section in which there is a longitudinal crack, indicated at X, which it is important to make tight without interrupting the service through the line, the crack in question being of too great a length to be enclosed within a split sleeve of ordinary construction. In this instance I have shown two split sleeves of known construction coupled together by my invention, and applied to the pipe in such manner as to completely enclose the crack X, and thus stop the leak therethrough. As these split sleeves are exactly similar in construction, and are identical with each other, a description of one will suffice for both. Each sleeve comprises a sleeve portion, indicated at 30, which is formed in segments, generally in two segments, provided at opposite sides with side clamping bars or portions, 31, connected by side bolts, 32, and nuts, 33, which clamp the segments upon side packings, indicated at 34, of rubber or other suitable material, so as to enable the sleeve to be placed around the pipe, and the segments thereof secured together. The sleeve, 30, is provided adjacent to each end with inwardly extending portions, 35, forming end packing recesses, to receive end packings, 36, one of which is illustrated at the outer end of each of the sleeves shown, and in ordinary practice when a single sleeve is applied, it is provided with two clamping rings, indicated at 37, one of which is shown at the outer end of each sleeve in Fig. 8, which are provided with portions to engage the packings, 36, and are ordinarily drawn together by through bolts in a well known way. The particular sleeves shown in Fig. 8 are also provided in this instance with exterior reinforcing flanges, 38, having bolt apertures therein registering with those in the clamping rings, 37. The particular form of split sleeve, however, forms no part of my present invention.

Assuming that the crack in the pipe is of such length that it can be completely enclosed in two ordinary sleeves, the two sleeves are installed upon the pipe in the manner shown in Fig. 8, with the gasket member, 303, and the confining strip or band, 308, of steel or other hard metal held in position by the temporary securing device or wire, 319, in this instance having their marginal portions extending within the adjacent end packing recesses of both split sleeves, and the side bolts and nuts of the split sleeves are tightened up. The end packings, 36, are then placed in position within the end packing recesses at the outer ends of the sleeves, and the usual clamping rings, 37, 37, which are also made in segments and united in any usual or preferred manner, so that they may be placed around the pipe, are positioned properly in relation to the end packings, 36. Bolts, 321, and nuts 322, are then placed in position in such manner that they will not only draw the clamping rings, 37, inwardly to compress the packings, 36, but will also force the adjacent sleeves toward each other so as to compress the gasket member, 303, lengthwise of the pipe, and cause it to expand transversely thereof into firm contact with the outer surface of the pipe and with the inner surfaces of the adjacent end packing recesses of the two sleeves, the outer portions of the end packing recesses in the sleeves extending over marginal portions of both the gasket member, 303, and the confining strip or band, 307, as clearly shown in Fig. 8, thus uniting the two sleeves by a gas-joint, and simultaneously forming a gas-tight joint at the outer end of each sleeve by means of the packings, 36. In the present instance I have shown the bolts, 321, as extending from one of the reinforcing flanges, 38, of one sleeve, to and through the exterior clamping ring for the other sleeve, but it will be understood that the same result would be accomplished by using through bolts, as shown at 321a, for example, in Fig. 8, of sufficient length to extend from one clamping ring, 37, to the other, or by using short bolts to connect the adjacent flanges, 38, with each other and the flanges, 38, at the outer ends of the sleeve with the adjacent clamping ring, in a manner similar to that illustrated in Fig. 9, and hereinafter described.

In this instance the clamping elements are provided by the end packing recesses of the two sleeves. Otherwise the construction and operation is substantially the same as that illustrated and described with reference to Figs. 1 to 4, so far as my present invention is concerned. It will also be understood that any desired number of sleeves can be connected in this manner so as to enclose a crack of any particular length.

It sometimes happens that in a line composed of bell and spigot pipe sections, a long crack or split will occur in the bell end of the pipe. Split sleeves have been made of sufficient internal diameter to completely enclose a bell and spigot joint for the purpose of repairing a leak between the bell member and spigot member thereof, but such a split sleeve is frequently not sufficiently long to enclose a split or crack in the bell member which may extend a considerable distance along the pipe section. In such case an ordinary split sleeve, or sleeves may be coupled together, and in turn coupled with a split sleeve enclosing the bell and spigot joint by my invention so as to completely enclose the elongated split or crack.

In Fig. 9, for example, in which the parts corresponding to those illustrated in Figs. 1 to 4 are given the same reference numerals with the addition of 400. I have illustrated such an application of my invention. In this instance, 401, 401, represent two pipe sections of the bell and spigot type having their ends connected by the usual bell and spigot joint, of which 401a, represents the bell, and 401b the spigot, the joint being packed in any usual or preferred manner. It is assumed in this figure that an elongated crack, indicated at X', exists in the bell member, and extends a considerable distance along the pipe beyond the portion which could be enclosed with an ordinary split repair sleeve suitable for bell and spigot joints. Such a sleeve is shown in Fig. 9, the sleeve proper being indicated at 40, formed in segments, provided with the usual side clamping bars, 41, and side packings, 44, the side bars being clamped together upon the packing by the side bolts, 42, and nuts, 43, in the usual manner so as to enclose the bell and spigot joint. The sleeve, 40, is provided at each end with a packing recess to receive end packings, one of which is indicated at 46, in position in the recess at the outer end, and compressed by the usual split clamping ring, 47, which in this instance is connected by bolts, 49, and nuts, with a flange, 48, on the adjacent end of the sleeve. In connection with this split sleeve, 40, I have shown an ordinary split sleeve, 50, of diameter simply sufficient to encircle the pipe, provided with side clamping bars, 51, clamped by side bolts, 52, and nuts, 53, upon side packings, 54, in the usual manner, said sleeve being provided at each end with a packing recess to receive end packings, one of which is shown at 56, engaging the recess at the outer end of the sleeve, and compressed by a split clamping ring, 57, connecting said ring with a flange, 58, on the sleeve.

In assembling the two split sleeves shown, the packing recesses at the adjacent ends of the sleeves, 40 and 50, are made to surround the gasket member, 403, and the confining strip or band, 408, of steel or other hard metal, held in position by the wire or other retaining means, 419, and the adjacent flanges of the two sleeves, indicated respectively at 48 and 58, are connected by bolts, 59a, so as to draw the sleeves longitudinally toward each other to compress the gasket member longitudinally of the pipe and expand it transversely thereof in the manner previously described, thereby forming a gas-tight joint between the adjacent ends of the sleeves and the exterior surface of the pipe, and coupling the two sleeves to be used together so as to completely enclose the crack or split, X', in the bell end. Obviously a plurality of sleeves of either kind can be connected in this manner on one or both sides of a bell and spigot joint, so as to effect a repair where one or both of the pipe sections is cracked for a greater length and could not be repaired by a single sleeve of either type. In this case the adjacent end packing recesses of the sleeves form the clamping elements.

I have also found my invention extremely advantageous in effecting the repair of a leaking flange joint, and in Fig. 10, in which the parts corresponding with those in Figs. 1 to 4 are given the same reference numerals with the addition of 500, I have illustrated the application of my invention to the repair of a leaky flange joint in a gate valve, for example. In this figure, 60 and 61, are two parts of a gate valve casing, each provided with a flange, indicated at 62 and 63, the flanges being united by bolts, 64 and 65, upon an intermediate packing, 66, in the usual manner, to form a flange joint. Where such a joint develops a leak, it can be readily repaired by the aid of my invention, by surrounding the joint with a gasket member, indicated at 503, and confining strip or band, 508 of steel or other hard metal, held in place by a retaining wire, 519, in association with a pair of clamping rings, 509, constructed and operating in exactly the same manner as previously described with reference to Figs. 1 to 4 and Fig. 5, the clamping rings being connected by a plurality of bolts, 521 and nuts, 522. In this case the clamping rings, 509, may be made integral if they can be placed in position around the flange joint. If the flange joint is in such position that this is not possible, the clamping rings may be made in segments, as illustrated in Fig. 4.

It will be understood that flange joints of any kind may be readily repaired by the aid of my invention, in the manner described, and leaks therein positively stopped.

In Figs. 11 and 12, in which the parts corresponding with those shown in Figs. 1 to 4 are given the same reference numerals with the addition of 600, I have illustrated a modified form of my invention, in which only one of the clamping elements is provided with a retaining flange overlapping marginal portions of the gasket member, and the metal confining strip or band, this embodiment of my invention being particularly applicable to the repair of leaking bell and spigot joints. In these figures, 601, represents a pipe section having a bell end, 601a, and 601b represents the spigot end of an adjacent pipe section, 601, the parts being connected by packing material in the usual manner in bell and spigot joints.

In this instance it will be assumed that a leak has developed in the bell and spigot joint adjacent to the packing, indicated at 70. In this instance the repair is effected by surrounding the spigot, 601b, with a gasket member, indicated at 603, so that one edge thereof engages the packing, 70, and the face of the bell exterior thereto, the gasket member being surrounded by the confining strip or band, 608 of steel or other hard metal, held in position by the retaining wire, 619, as previously described. 609 represents a single clamping ring, which is formed in segments, each provided in this instance at each end with a perpendicular flange, 609a, the adjacent flanges being connected by a bolt, 614, and nut, 614a, and each segment being provided with a semi-circular flange, 612, which overlaps the confining strip or band, 608, and forms a recess to receive marginal portions of the gasket member at the outer edge thereof. In order to prevent portions of the gasket member, 603, from flowing between the adjacent edges of the segments of ring, 609, I have provided in this instance segmental plates, 71 (one of which is shown in Figs. 11 and 12) disposed perpendicularly to the axis of the bell, and serving as a lining for portions of the packing recess of the ring adjacent to the meeting ends of the segments thereof. Each of these plates is preferably provided at its outer edge with a curved flange, indicated at 72, which is inserted between the gasket member, 603, and the confining strip or band, 608, as clearly shown in Figs. 11 and 12. 73 represents an ordinary bull ring of any usual or preferred construction, surrounding the exterior of the bell, and also formed in segments, connected together in any usual or desired manner, the construction of said bull ring forming no part of my present invention. In this case the bull ring and the face of the bell and packing form the other clamping element, and bolts, 621, are passed through registering apertures in the bull ring and clamping ring, and provided with nuts, 622, so that the clamping ring can be drawn toward the bull ring and the face of the bell and the packing therein, thus compressing the gasket member, 603, as hereinbefore described, in a direction longitudinally of the pipe line, and causing it to expand in a direction transversely thereof between the exterior of the spigot and the inner face of the confining strip, which is in this instance reinforced by the engagement of the flange, 612, with its exterior face, thus making a tight joint, the plates, 71, preventing the flow of the rubber between the separated ends of the clamping ring segments, which is made in this form for the purpose of enabling it to be adjusted to fit pipes of varying diameters.

The particular construction of the clamping ring shown in Figs. 11 and 12 forms no part of my present invention, but will constitute the subject matter of a separate application, and is not herein claimed.

What I claim and desire to secure by Letters Patent is:

1. In a leak repair device, the combination with a gasket member consisting of a strip of packing material of a length to enable it to be placed around a welded joint with its ends abutting, said gasket member having a substantially centrally located longitudinal recess to accommodate projecting portions of the weld, a metal confining strip of less width than the gasket member adapted to surround the central portions of said gasket member, a securing wire surrounding the said confining strip, a pair of split clamping rings each provided with a face to engage the adjacent edge of the gasket member, and an annular flange for enclosing the adjacent marginal portions of said gasket member and of said confining strip, and engaging the outer surface of said strip, and bolts and nuts for connecting said clamping rings.

2. In a leak repair device, the combination with a plurality of split sleeves, each provided with end packing recesses and adapted to be arranged in axial alignment around portions of a pipe line, a gasket member comprising a strip of packing material having marginal portions located in the adjacent end packing recesses of contiguous sleeves, and holding the ends of said sleeves separated, a metal confining strip of less width than the gasket member surrounding said gasket member and having marginal portions extending into the said adjacent end packing recesses, end packings and end packing rings at the outer ends of said sleeves, and clamping means for compressing the end packings, and drawing the adjacent sleeves toward each other to compress said gasket member in the direction of its width.

3. In a leak repair device, the combination with a plurality of split sleeves, each provided with end packing recesses and adapted to be arranged in axial alignment around portions of a pipe line, a gasket member comprising a strip of packing material having marginal portions located in the adjacent end packing recesses of contiguous sleeves, and holding the ends of said sleeves separated, a metal confining strip of less width than the gasket member surrounding said gasket member and having marginal portions extending into the said adjacent end packing recesses, end packings and end packing rings at the outer ends of said sleeves, and clamping means for compressing the end packings and drawing the adjacent sleeves toward each other to compress said gasket member in the direction of its width, and retaining means between the adjacent ends of contiguous sleeves for engaging said confining strip and holding it in position around the gasket member.

4. In a leak repair device, the combination with a gasket member comprising a strip of packing material, a metal confining strip of less width than the gasket member to surround the gasket member, clamping elements including a pair of split clamping rings, at least one of said rings being provided with an annular face to engage one edge of the gasket member, and an annular flange to enclose adjacent marginal portions of said gasket member and said confining strip, segmental plates bridging the space between the portions of said split ring and interposed between the adjacent edge of said gasket member and said ring, and bolts and nuts for connecting said split rings to compress the gasket member in the direction of its width.

5. In a leak repair device, the combination with a gasket member comprising a strip of packing material, a metal confining strip of less width than the gasket member to surround the gasket member, clamping elements including a pair of split clamping rings, at least one of said rings being provided with an annular face to engage one edge of the gasket member, and an annular flange to enclose adjacent marginal portions of said gasket member and said confining strip, segmental plates bridging the space between the portions of said split ring and interposed between the adjacent edge of said gasket member and said ring, said plates having flange portions extending between the gasket member and the confining strip, and bolts and nuts for connecting said split rings to compress the gasket member in the direction of its width.

6. The combination of a gasket member comprising a strip of non-metallic elastic packing material surrounding a cylindrical surface in sealing contact therewith, means for applying pressure to said gasket member comprising opposed annular clamping elements at least one of which is provided with a compressing face and an annular flange portion adapted to fit over and embrace portions of said gasket member, and a hard metal confining strip of less width than the gasket member surrounding said gasket member and bridging the space between said clamping elements for preventing extrusion of the gasket member.

7. The combination of a gasket member comprising a strip of non-metallic elastic packing material surrounding a cylindrical surface in sealing contact therewith, means for applying pressure to said gasket member comprising opposed annular clamping elements, each of which is provided with a compressing face for applying pressure to said gasket member transversely thereof, and an annular flange portion surrounding marginal portions of the gasket member and adapted to fit over and embrace said portions, and a hard metal confining strip of less width than the gasket member, surrounding said gasket member within said flange portions of said clamping elements and bridging the space between said clamping elements for preventing extrusion of the gasket member, said clamping elements sealingly engaging the marginal portions of said gasket member and having a sliding engagement with marginal portions of said confining strip.

8. The combination of a gasket member comprising a strip of non-metallic elastic packing material surrounding cylindrical surfaces in sealing contact therewith, means for applying pressure to said gasket member comprising opposed clamping members, each of which is provided with a compressing face and an annular flange portion adapted to fit over and embrace portions of said gasket member, a hard metal confining strip of less width than said gasket member extending around the inner face of said gasket member and bridging space between portions of said cylindrical surfaces for preventing extrusion of the gasket member, and a hard metal confining strip of less width than said gasket member surrounding said gasket member within said flange portions of said clamping members, and bridging the space between said clamping elements for preventing extrusion of the gasket member.

9. The combination of a gasket member comprising a strip of non-metallic elastic packing material surrounding a cylindrical surface in sealing contact therewith, means for applying pressure to said gasket member comprising opposed annular clamping elements, at least one of which is formed of segments connected for use and provided with a compressing face, an annular flange portion adapted to fit over and embrace portions of said gasket member, and a hard metal confining strip of less width than the gasket member surrounding said gasket member, and bridging the space between said clamping elements, and the adjacent portions of the spaces between said segments.

10. The combination of a gasket member comprising a strip of non-metallic elastic packing material surrounding a cylindrical surface in sealing contact therewith, means for applying pressure to said gasket member comprising opposed annular clamping elements, each of which is provided with a compressing face and a substantially cylindrical flange portion adapted to fit over and embrace portions of said gasket member, said clamping elements being formed of segments connected for use, a hard metal confining strip of less width than the gasket member and of greater width than the distance between the flange portions of said opposed clamping member, surrounding the central portion of said gasket member within said flange portions, and bridging the space between said flange portions of said opposed clamping members and the adjacent portions of the spaces between said segments, for preventing extrusion of the gasket member, said clamping elements sealingly engaging the marginal portions of said gasket member and having a sliding engagement with marginal portions of said confining strip, and bolts and nuts connecting said clamping elements.

GEORGE H. PFEFFERLE.